J. MITCHELL.
NAPKIN HOLDER STAND.
APPLICATION FILED SEPT. 13, 1916.
1,238,552.
Patented Aug. 28, 1917.
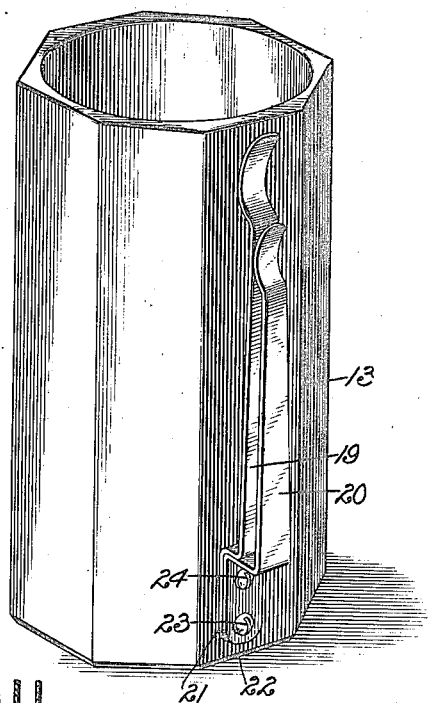
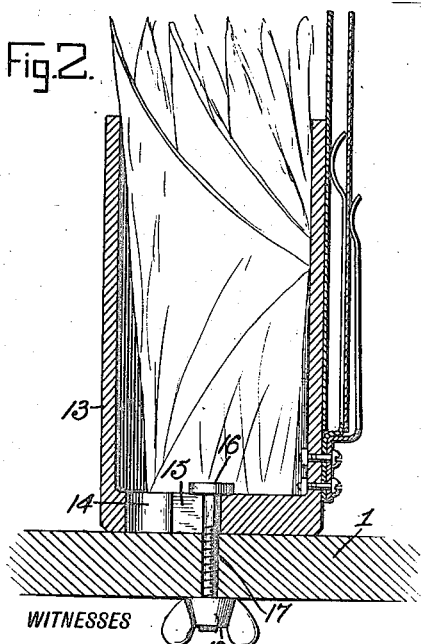
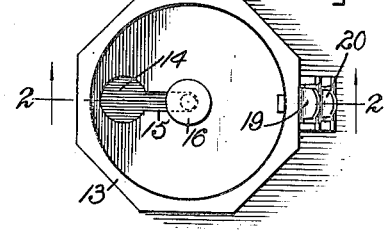
WITNESSES
INVENTOR
John Mitchell
BY
ATTORNEYS

UNITED STATES PATENT OFFICE.

JOHN MITCHELL, OF PINE BLUFF, ARKANSAS.

NAPKIN-HOLDER STAND.

1,238,552. Specification of Letters Patent. Patented Aug. 28, 1917.

Application filed September 13, 1916. Serial No. 119,799.

*To all whom it may concern:*

Be it known that I, JOHN MITCHELL, a citizen of the United States, and a resident of Pine Bluff, in the county of Jefferson and State of Arkansas, have invented a new and Improved Napkin-Holder Stand, of which the following is a full, clear, and exact description.

This invention relates to stands for napkins and has for an object the provision of an improved arrangement which may be easily and firmly clamped in position on a counter so as not to be knocked over though always in position for use.

Another object in view is to provide a stand with clamping means for holding a container in position and also for holding menu clips in position.

A still further object in view is to provide a stand in which the holder is removably secured to a counter or other support.

In the accompanying drawings:—

Figure 1 is a perspective view of a stand disclosing an embodiment of the invention, the same being shown applied to a counter.

Fig. 2 is a longitudinal vertical section through Fig. 3 on line 2—2, the same being shown applied to a counter.

Fig. 3 is a top plan view of the stand shown in Fig. 1.

Referring to the accompanying drawings by numerals, 1 indicates a counter or other support of any desired kind to which the container 13 is secured.

The container 13 may be made from wood, glass or other material, and is provided with an opening 14 in the bottom merging into slot 15 whereby the head 16 of the clamping bolt 17 may pass through the bottom into the container and then the container forced laterally so that the parts will assume the position shown in Figs. 2 and 3. The clamping nut 18 is then tightened so that the container is firmly clamped in position though arranged to be quickly and easily removed. In this form of the invention the menu clips 19 and 20 are formed with offset portions 21 and 22 through which the clamping screws 23 and 24 pass, said screws, or bolts if desired, extending into the body of the container 13. Where bolts are used for securing the clips 19 and 20 in place the nuts are preferably arranged interiorly as shown in Fig. 2, nuts being usually desirable where the container is made from glass or other similar material.

What I claim is:

The combination with a container, of a pair of superimposed spring clips offset at one end and curved at the opposite end, one of the clips at the curved end bearing against said container and the curved end of the other clip bearing against the first mentioned clip adjacent the end thereof, and fastening means extending through both of said clips at their offset ends for connecting the clips with the container and causing the second clip to press against the first clip.

JOHN MITCHELL.

Witnesses:
C. H. BOLINGER,
G. E. POSS.